Feb. 12, 1929.
E. H. ADAMS ET AL
1,701,742
POWER LIFT FOR CULTIVATORS
Filed Sept. 28, 1923    3 Sheets-Sheet 1
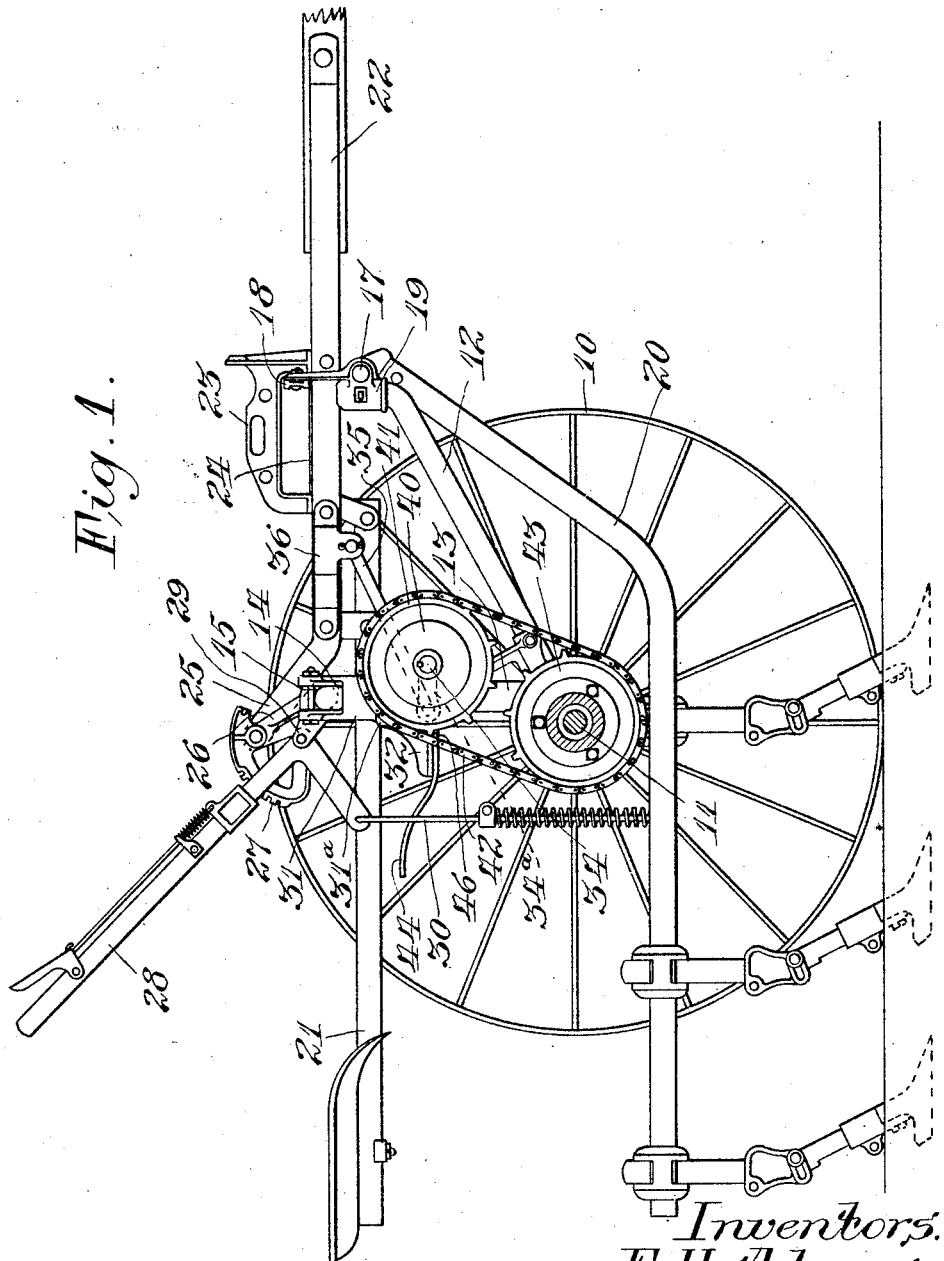
Inventors.
E. H. Adams
and J. I. Mitchell,
By N. P. Doolittle,
Atty.

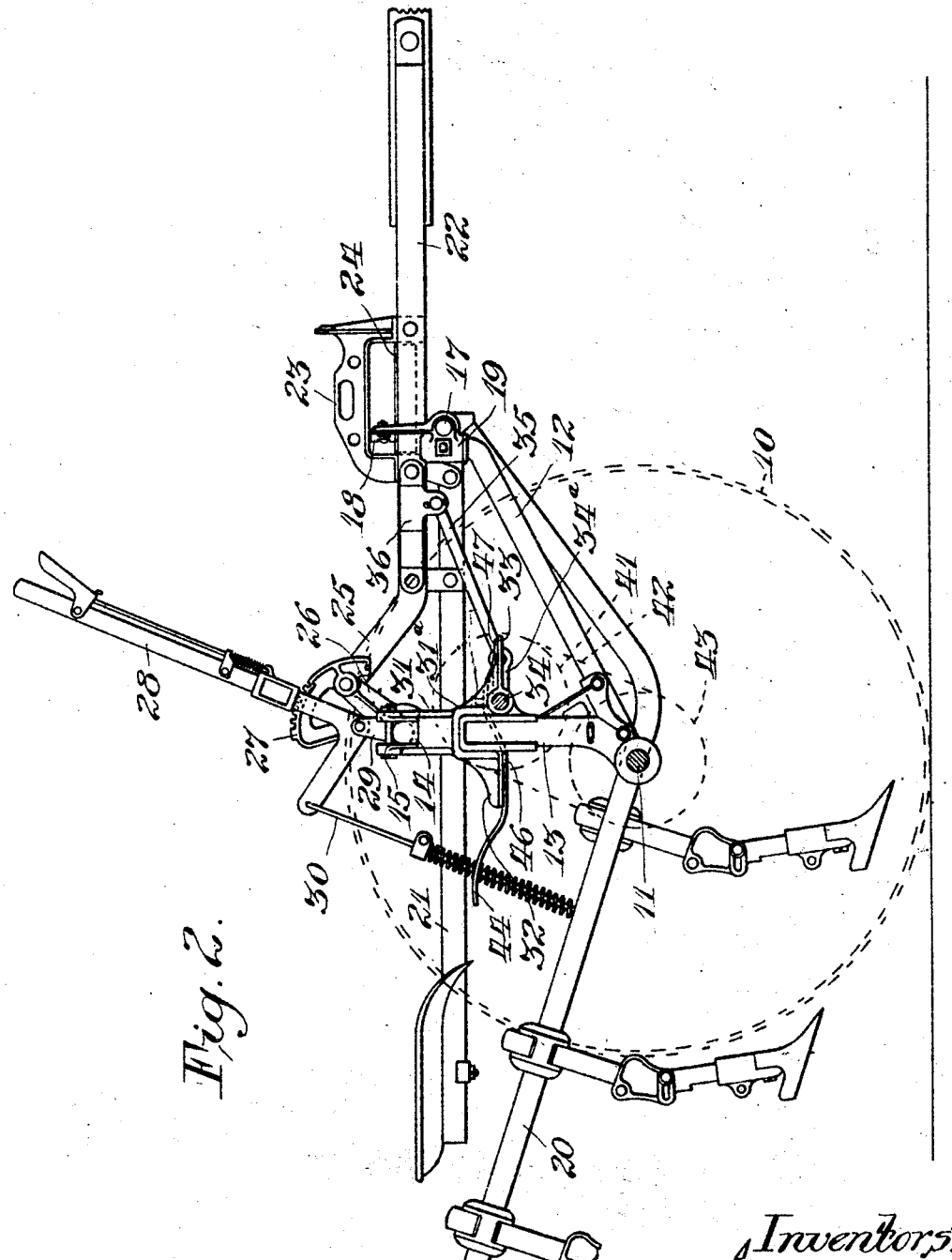

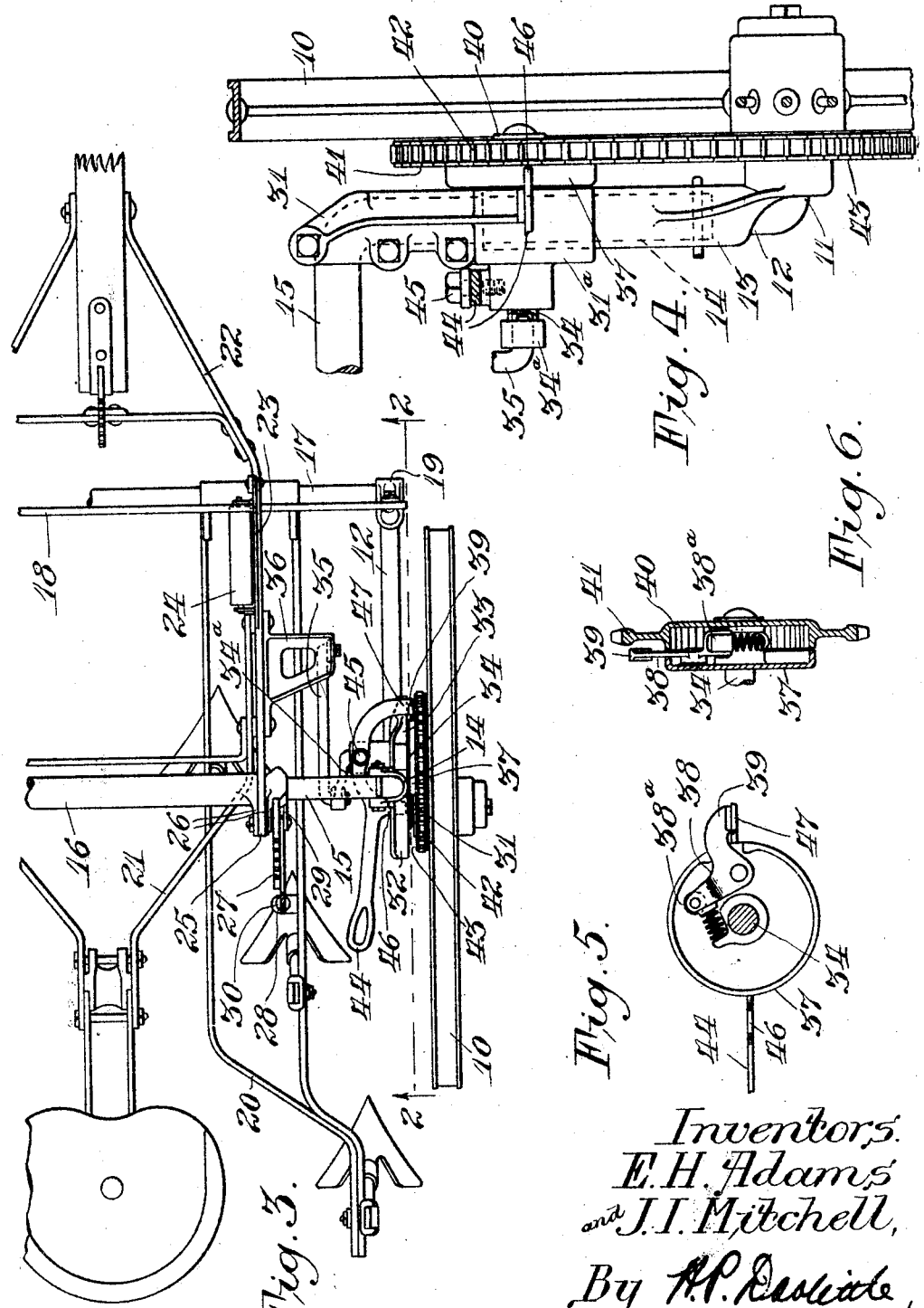

Patented Feb. 12, 1929.

1,701,742

UNITED STATES PATENT OFFICE.

EDWIN H. ADAMS AND JOSEPH I. MITCHELL, OF AUBURN, NEW YORK, ASSIGNORS TO INTERNATIONAL HARVESTER COMPANY, OF CHICAGO, ILLINOIS, A CORPORATION OF NEW JERSEY.

POWER LIFT FOR CULTIVATORS.

Application filed September 28, 1923. Serial No. 665,272.

This invention relates to mechanism for lifting and lowering the tool beams of a cultivator or similar implement by power from one or more of its supporting wheels. The main object of the invention is to provide a power lift device capable of being combined with well known types of cultivators without materially altering the cultivator structure and which will take the place of the hand lift for the beams. The particular object in view is to devise a power lift for cultivators of the type in which the weight of the beams or tool gangs is balanced by a fore and aft shift of the beam carrying frame as the tool beams are raised and lowered.

A further object is to provide control mechanism for the power lift device that is simple in structure and easily operated.

With these objects in view, the invention resides in the combination of elements and details of construction, or in the equivalents thereof hereinafter described and claimed.

In the accompaying drawings—

Fig. 1 is an end elevation of a cultivator with the near axle in section and showing the power lift device of this invention in position;

Fig. 2 is a similar view on the line 2—2 of Fig. 3;

Fig. 3 is a partial plan view of a cultivator including the invention;

Fig. 4 is a detail view from the rear showing the power lift device in position on the upright portion of the arched wheel frame;

Fig. 5 is a detail view of the intermittent clutch element; and

Fig. 6 is a detail sectional view through the clutch device.

As illustrating the special purpose of the invention, it is shown in this instance in combination with a balanced cultivator of the construction disclosed in the patent to Cady No. 1,358,057, Nov. 9, 1920, although not limited thereto in use. The cultivator to which the improvement herein disclosed is applied comprises supporting wheels 10 journaled on lateral extensions or spindles 11 forming part of upwardly and forwardly extending arms 12. These arms are fastened to brackets 13 rotatably mounted on vertically disposed arms 14 of the L-shaped axle members 15, the horizontal arms of which are, as usual in this type of machine, adjustably secured within a connecting sleeve 16. The axles 15 are thus tied together while the sleeve 16 is free to oscillate to a certain extent on the horizontal branches of the axle members 15. The arms 12 are connected at their forward ends by a tool beam supporting bar 17 below the frame 22 and a transverse I-beam 18 above the frame. Each arm 12 has a vertical forward end portion extending into the socket of a bracket 19 connecting the bar 17 and beam 18. The tool beams 20 extend upwardly and are pivoted at their forward ends on the bar 17. The arms 12 carrying the wheels and the connecting members 17, 18, and the tool beams 20 are thus connected to move laterally in unison as the sleeves 13 swivel on the upright ends 14 of the axles 15. It is understood that swivelling of the wheels to guide the cultivator is effected through the usual foot lever mechanism, not shown.

The main or wheel frame structure just described forms the support for the draft frame and seat frame which comprises the rear seat supporting members 21 and the front draft members 22 connected by the arched castings 23 which pass over the transverse I-beam 18. The arms of the casting 23 carry rollers 24 on which the beam 18 rides during transverse movement. The rear ends of the draft frame members 22 are inclined upwardly, as at 25, and pivoted to arms 26 on the sleeve 16, these arms being integral with a toothed sector 27 that cooperates with an adjusting lever 28 pivoted on a bracket 29 fixed to one of the axle members 15. The lifting arm of lever 28 is connected to the tool beam beneath it by the usual spring pressed link connection 30. The construction so far described is that of the patent to Cady above mentioned in which a lever is provided for moving the draft and seat frame 21, 22 back and forth on the wheel frame, thereby oscillating the sleeve 16 and with it the levers 28 and causing the gangs to be raised and lowered, as therein more particularly described.

In the present invention, the hand lift is omitted and in lieu thereof there is secured to the upright portion of one of the axle members 15 a casting 31 constituting a bearing bracket having oppositely extended wings 32, 33 which are integral with a skirt portion 31ª overhanging the sleeve 13. In casting 31 there is journaled between said wings a crank shaft 34. The inner end of this shaft is provided with a crank 34ª which is connected by a link 35 with a laterally extending bracket 36 on one side of the draft frame. The outer end of crank shaft 34 has keyed thereto a clutch disk 37, on the inner face of which there is pivoted a spring pressed locking pawl 38 that has a trip arm 39 extending radially beyond the peripheral flange of disk 37. Journaled on the end of shaft 34, in cooperative relation with member 37, there is a constantly rotating clutch member 40 which is formed with internal notches with which a roller 38ª on pawl 38 is adapted to interlock in well known manner. The clutch member 40 forms an integral part of a sprocket rim 41 which is connected by a chain 42 with a driving sprocket 43 fixed to the hub of the supporting wheel.

For controlling the actions of the power lift device, there is provided a horizontally positioned lever 44 pivoted at 45 on the bearing bracket 31 at a point just above the axis of the shaft 34. The pivot point of this lever is located at the middle of an arched portion thereof which embraces the clutch disk 37 terminating in opposite stop arms 46, 47, which extend adjacent the periphery of said clutch disk and in the path of movement of the trip arm 39. Each of these arms 46, 47 is in frictional engagement with and is backed or supported by one of the wings 32, 33 of the bracket 31, as seen in Figs. 2 and 3, this frictional engagement being sufficient to hold the lever in adjusted position and the wings serving to prevent bending or yielding of the arms 46, 47 when engaged by the trip 39. The handle of the lever 44 extends within convenient reach from the seat of the cultivator and it is evident that movement thereof serves to bring either arm 46 or arm 47 into the path of trip arm 39, thereby stopping rotation of disk 37 at approximately each half revolution and reciprocating link 35 which is eccentrically pivoted with respect thereto.

In the operation of the device, the clutch sprocket 41 is constantly driven during travel of the cultivator and the member 37 is normally held locked by the engagement of trip 39 with one of the arms 46 or 47. When the tool beams are in lowered position, as in Figs. 1 and 3, and it is desired to raise the tools, the lever 44 is swung outwardly withdrawing arm 47 and moving arm 46 into position to engage trip 39. This permits pawl 38 to spring into engagement with the notches in member 30 whereupon member 37 will make a half revolution when arm 39 will engage arm 46 and member 37 be again locked. This will have caused crank 34ª to move through an arm 180° thereby moving the draft and seat frame forwardly on the wheel frame and causing the parts to take the position shown in Fig. 2. On the next movement of the lever 44, this action will be reversed.

It is evident, therefore, that a simple and efficient power lift of novel construction has been provided and, while the foregoing disclosure exemplifies the preferred form thereof, variations are possible within the scope of the following claims.

We claim as our invention:

1. An implement comprising a wheel supported tool carrying frame, a seat carrying frame movable thereon in a horizontal plane, means for raising and lowering the tools by said movements of the seat frame, and a traction actuated power device connecting said frames and including means for moving the seat frame in opposite directions alternately.

2. An implement comprising a wheel supported tool carrying frame, a seat carrying frame movable thereon in a horizontal plane, means for raising and lowering the tools by said movements of the seat frame, and traction actuated clutch mechanism mounted on the wheel frame including an intermittently rotatable member having a link eccentrically connected thereto and connected to the seat frame.

3. An implement having a wheel frame, tool carrying beams supported thereby, a seat supporting frame movable relative to the wheel frame, and a traction actuated power device for raising and lowering the tool carrying beams and simultaneously altering the positions of the wheel frame and seat frame relative to each other.

4. An implement comprising a wheel supported cultivator beam carrying frame, a seat carrying frame horizontally movable as a body relative to the first mentioned frame, means for raising and lowering the cultivator beams by said movement of the seat frame relative to the beam carrying frame, and a traction actuated power device connecting said frames and including means for moving the seat frame in opposite directions alternately to simultaneously elevate or lower a cultivator beam and balance the implement.

5. An implement comprising a wheel supported tool carrying frame, a draft frame horizontally movable relative to the first frame, tools beneath the first frame, means for raising and lowering the tools by said movements of the draft frame, power lift mechanism mounted on the wheel frame including an intermittently rotatable member having a link eccentrically connected thereto and connected to the draft frame for causing relative movement of said frames, and manually operable depth adjusting means movable bodily when the power lift operates.

6. A pivot axle cultivator comprising a frame, cultivator beams, an arched axle having constantly upright ends supporting the frame, pivot axles journaled on said ends, supporting wheels journaled on said pivot axles and oscillatable therewith about said ends, a rotatable driving element carried by one of said wheels, a rotatable driven element journaled in a bearing fixed relative to the arched axle, driving means connecting said driving and driven elements, and means operated by said driven element for elevating or lowering said beams by causing said axle to move fore or aft at the will of the operator.

7. A pivot axle cultivator comprising a frame, cultivator beams, an arched axle having constantly upright ends supporting the frame, pivot axles journaled on said ends, supporting wheels journaled on said pivot axles and oscillatable therewith about said ends, a rotatable driving element carried by one of said wheels, and means operated by said driving element for elevating or lowering said beams at the will of the operator.

In testimony whereof we affix our signatures.

EDWIN H. ADAMS.
JOSEPH I. MITCHELL.